US008644205B2

(12) United States Patent
Barbaresi et al.

(10) Patent No.: US 8,644,205 B2
(45) Date of Patent: Feb. 4, 2014

(54) TRANSMISSION OF MULTIMEDIA CONTENTS TO A PLURALITY OF MOBILE USERS

(75) Inventors: Andrea Barbaresi, Turin (IT); Andrea Buldorini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1416 days.

(21) Appl. No.: 11/658,408

(22) PCT Filed: Jul. 27, 2004

(86) PCT No.: PCT/IT2004/000412
§ 371 (c)(1),
(2), (4) Date: Jan. 25, 2007

(87) PCT Pub. No.: WO2006/011164
PCT Pub. Date: Feb. 2, 2006

(65) Prior Publication Data
US 2008/0004054 A1    Jan. 3, 2008

(51) Int. Cl.
H04H 20/71    (2008.01)
G01R 31/08    (2006.01)
G06F 11/00    (2006.01)
G08C 15/00    (2006.01)
H04J 1/16    (2006.01)
H04J 3/14    (2006.01)
H04L 1/00    (2006.01)
H04L 12/26    (2006.01)
H04W 4/00    (2009.01)
H04W 72/00    (2009.01)

(52) U.S. Cl.
USPC ......... 370/312; 370/252; 370/329; 455/452.1

(58) Field of Classification Search
USPC ........ 455/450, 452.1, 452.2, 3.01, 3.05, 3.06; 370/252, 270, 312, 329
See application file for complete search history.

(56) References Cited

U.S. PATENT DOCUMENTS

| 7,330,699 | B2 * | 2/2008 | Chuah et al. | 455/67.11 |
| 7,349,711 | B2 * | 3/2008 | Hu et al. | 455/519 |
| 7,546,132 | B2 * | 6/2009 | Lee et al. | 455/503 |
| 7,565,138 | B2 * | 7/2009 | Kim et al. | 455/414.3 |
| 7,583,629 | B2 * | 9/2009 | Lee et al. | 370/329 |
| 7,623,483 | B2 * | 11/2009 | Yi et al. | 370/328 |
| 2003/0134653 | A1 * | 7/2003 | Sarkkinen et al. | 455/517 |

(Continued)

FOREIGN PATENT DOCUMENTS

| EP | 1 418 710 A1 | 5/2004 |
| WO | WO-2004/017581 A1 | 2/2004 |
| WO | WO-2004/057898 A1 | 7/2004 |
| WO | WO 2004057898 A1 * | 7/2004 |

OTHER PUBLICATIONS

ETSI TS 125 346 V6.1.0, Universal Mobile Telecommunications System (UMTS); Introduction of Multimedia Broadcast / Multicast Service (MBMS) in the Radio Access Network (RAN); Stage 2 (3GPP TS 25.346 V6.1.0 Release 6, Jun. 2004.*

(Continued)

Primary Examiner — Ariel Balaoing
Assistant Examiner — Larry Sternbane
(74) Attorney, Agent, or Firm — Finnegan, Henderson, Farabow, Garrett & Dunner, L.L.P.

(57) ABSTRACT

A method of transmitting information content to a plurality of mobile equipment, in which information related to the capability of properly decoding the content from a p-t-m radio bearer is collected by the radio network controller from the UEs that have joined the service. The proper configuration for the transmission of the content is then selected based on the collected information.

14 Claims, 3 Drawing Sheets

(56) References Cited

U.S. PATENT DOCUMENTS

| | | | |
|---|---|---|---|
| 2003/0228865 A1* | 12/2003 | Terry | 455/422.1 |
| 2004/0229629 A1* | 11/2004 | Yi et al. | 455/452.2 |
| 2004/0253959 A1* | 12/2004 | Hwang et al. | 455/450 |
| 2005/0074024 A1* | 4/2005 | Kim et al. | 370/432 |
| 2005/0105544 A1* | 5/2005 | Pirskanen et al. | 370/432 |
| 2005/0118992 A1* | 6/2005 | Jeong et al. | 455/422.1 |
| 2005/0169202 A1* | 8/2005 | Ratasuk et al. | 370/312 |
| 2005/0195760 A1* | 9/2005 | Lee et al. | 370/312 |
| 2005/0232176 A1* | 10/2005 | Van Lieshout et al. | 370/312 |
| 2005/0232292 A1* | 10/2005 | Richards et al. | 370/432 |
| 2008/0108368 A1* | 5/2008 | Yi et al. | 455/452.2 |

OTHER PUBLICATIONS

3GPP TS 25.331 V3.19.0, 3rd Generation Partnership Project; Technical Specification Group Radio Access Network; Radio Resource Control (RRC) protocol specification, Jun. 2004.*

NTT DoCoMo; "On Minimum Bit Rate to Be Supported by MBMS UEs"; Document TSGR1(04)0593, TSG-RAN Working Group 1 #37 Meeting, pp. 1-3, (2004).

3rd Generation Partnership Project; Technical Specification Group Radio Access Network; "Introduction of the Multimedia Broadcast Multicast Service (MBMS) In The Radio Access Network (RAN)", Stage 2, (Release 6); 3GPP TS 25.346 V6.0.0. pp. 1-50, (2004).

Cheung et al.; "On the Use of Destination Set Grouping to Improve Fairness in Multicast Video Distribution", Proceedings of IEEE Infocom, vol. 2, Conf. 15, pp. 553-559, (1996).

$3^{rd}$ Generation Partnership Project; "Technical Specification Group Radio Access Network; Radio Resource Control (RRC) Protocol Specification", (Release 1999), 3GPP TS 25.331 V3.19.0, pp. 1-884, (2004).

* cited by examiner

# TRANSMISSION OF MULTIMEDIA CONTENTS TO A PLURALITY OF MOBILE USERS

CROSS REFERENCE TO RELATED APPLICATION

This application is a national phase application based on PCT/IT2004/000412, filed Jul. 27, 2004, the content of which is incorporated herein by reference.

TECHNICAL FIELD OF THE INVENTION

The present invention relates to the transmission of information content, particularly multimedia information content, to a plurality of mobile users, i.e. users of a mobile network. More particularly, the invention relates to a method and a system for transmission of information content to a plurality of mobile users.

BACKGROUND OF THE INVENTION

Mobile telephony networks (Public Land Mobile Networks, PLMNs) were initially conceived for enabling voice communications, similarly to the wired networks (Public Switched Telephone Networks, PSTNs), but between mobile users. Mobile telephony networks have experienced an enormous spread, especially after the introduction of second-generation mobile cellular networks, and particularly digital mobile cellular networks such as those complying with the Global System for Mobile communications (GSM) standard (and its United States and Japanese corresponding systems).

The services offered by these cellular networks in addition to plain voice communications have rapidly increased in number and quality; just to cite a few examples, Short Message Service (SMS) and Multimedia Message Service (MMS) services, and Internet connectivity services have been made available in the last few years. Third-generation mobile systems (e.g. Universal Mobile Telecommunications System, UMTS) are being now deployed and will allow to still increase the offering of services to the mobile users.

Some solutions have been proposed to overcome the limitations of conventional, switched-circuit cellular networks such as the GSM networks, so as to enable users of mobile terminals efficiently exploiting packet-based services, e.g. services offered through the Internet. One of the solutions that is acquiring a significant popularity is the General Packet Radio Service (shortly, GPRS). The GPRS is a digital mobile phone technology compatible with GSM networks (actually, built on the existing GSM network architecture) that enables data transfer at a speed higher than that allowed by pure GSM. Essentially, the GPRS can be viewed as a GSM add-up that supports and enables packet-based data communication. However, third-generation wireless communications systems, such as those complying with the UMTS, are more promising in terms of capability to offer high data transfer rates and guarantee quality of service.

In current GPRS or UMTS communications networks the information content is usually transferred in a point-to-point (p-t-p) modality (or unicast modality), upon activation of a session between a GPRS/UMTS mobile phone (or mobile station) and a service provider connected to a packet data network, e.g. a server connected to the core network or to the Internet; the activation of such a session involves the setting up of logical and physical connections between the server and the GPRS/UMTS mobile phone. In such a p-t-p communication mode, the radio resources to be allocated for the exchange of data between the GPRS/UMTS network and the GPRS/UMTS mobile stations depend on the number of different mobile stations simultaneously exploiting the GPRS/UMTS services, even if two or more mobile station users take advantage of the same information content at the same time. This limits the possibility of simultaneously accessing available GPRS/UMTS services by several users, unless the radio resources are oversized.

Thus, it is desirable to have the possibility of delivering information contents related to a same service exploitable by two or more users at a time through a point-to-multipoint (p-t-m) modality, so as to save the amount of allocated resources.

In this respect, the 3GPP (3rd Generation Partnership Project) is discussing the implementation, both in the GERAN (GSM/EDGE Radio Access Network) and in the UTRAN (UMTS Terrestrial Radio Access Network) frameworks, of a new kind of service architecture, named MBMS (Multimedia Broadcast/Multicast Service). Basically, MBMS targets simultaneous distribution of information content (e.g. multimedia content) to more than one mobile user from a single serving base station over a common radio resource.

Technical Specification 3GPP TS 25.346 V.6.0.0 (2004-03), for example, relates to the introduction of the MBMS services in the Radio Access Network (RAN) of a UMTS network, i.e. in the UTRAN. The document describes techniques for optimized transmission of MBMS bearer service in UTRAN, such as point-to-multipoint (p-t-m) transmission, selective combining and transmission mode selection between point-to-multipoint and point-to-point (p-t-p) bearer. For each MBMS service, data is transferred via an MBMS bearer between the SGSN and the UE (User Equipment). More in detail, for each MBMS service, data is transferred via one MBMS Iu bearer between the SGSN and the RNC (Radio Network Controller) in the whole MBMS service area. One MBMS Iu bearer is established per MBMS service at the MBMS Session Start or when the RNC needs to send data on the radio interface due to the presence of UEs. The MBMS Iu bearer on Iu is established per MBMS service and not per UE individually. Several MBMS RBs (Radio Bearers) may be linked to one MBMS Iu bearer, i.e. one MBMS Iu bearer on Iu may be mapped to multiple p-t-p and/or p-t-m traffic channels over the radio interface. In particular, the MBMS control function in the CRNC (Controlling RNC, i.e. the RNC controlling the MBMS service area) may decide to establish a p-t-m connection if the number of counted MBMS users in a cell exceeds a certain operator-defined threshold. Furthermore, the MBMS control function in the CRNC may decide to establish a p-t-m connection depending on the congestion scenario expected for a specific cell (e.g. in hotspot areas where no bearer type switching is needed). The MBMS control function in the CRNC establishes an MBMS RB by sending service specific signaling messages to all the UEs in the cell listening MBMS point-to-multipoint control channel (MCCH). UEs with activated service(s) may then execute the RB set-up. MBMS data is transferred on a MBMS point-to-multipoint traffic channel (MTCH) to all the UEs which have executed the RB setup. P-t-p transmission of MBMS data should use the DTCH (Dedicated Traffic CHannel) as defined for other dedicated services. According to the present version of the standard, the UE MBMS capability is not sent to the UTRAN. A consequence is that a UE may be counted although its actual capability does not allow to receive MBMS transmissions, e.g. because of its current RRC state. The standard describes a minimum UE capability requirement in order to allow operators to configure MBMS channels that can be common to all UEs supporting the given service.

However, in the document R1-04-0593, submitted by NTT DoCoMo at the TSG-RAN Working Group 1 #37 meeting (Montreal, May 10-14, 2004), the possibility of adopting a two-phase approach for the MBMS bit rate to be supported by MBMS UEs was proposed (Phase 1: 64 kbps or 128 kpbs and less when selective combining is performed, 128 kbps or 256 kpbs and more when selective combining is not performed; Phase 2: 256 kbps and less at all cases), to help the early introduction of MBMS UEs into the market, and assure higher quality for MBMS services later on.

SUMMARY OF THE INVENTION

The Applicant observes that a MBMS service carried out so that the radio access network is not aware of the actual capability of the UEs of properly receiving the MBMS data, as currently provided by the Technical Specification 3GPP TS 25.346, has a drawback in that if different UEs have joined the service, and the different UEs have different MBMS capabilities (i.e. different capabilities of properly receiving MBMS data), it may occur that the UEs having lower capability cannot receive the MBMS data, in case a p-t-m MBMS data transmission is configured for reception by UEs having higher capability. Alternatively, it may occur that the UEs having higher capability cannot fully enjoy such capabilities, in case a p-t-m MBMS data transmission is configured for reception by UEs having lower capability.

In any case, there is a risk for the mobile network operator of providing a service perceived by many users as a "low quality" service, unless MBMS services are provided in a scenario in which all UEs have the same capabilities. However, it is observed that such a scenario is quite unlikely, due to the continuous technological improvements in this field, and as also confirmed by the above mentioned document R1-04-0593.

According to the Applicant, there is thus a need of providing a service of transmission of information content (particularly multimedia content) to a plurality of mobile users, in which p-t-m radio transmission could be exploited in order to send the same content to different mobile users at the same time, but also in which the configuration of the content transmission could be optimized, possibly in each transmission session, according to the capability of the UEs that have requested the service. The configuration of the content transmission should be aimed to allow all the UEs to exploit the information content, but also the UEs having higher capability to take advantage of the higher capability to get a high quality service.

The Applicant has found that this need can be satisfied by providing a service in which information related to the capability of properly decoding the content from a p-t-m radio bearer is collected by the radio network controller from the UEs that have joined the service. The proper configuration for the transmission of the content is then selected based on the collected information.

In a first aspect, the present invention relates to a method of transmitting information content to a plurality of mobile equipment, the mobile equipment of said plurality comprising at least a first group of mobile equipment of a first point-to-multipoint class and a second group of mobile equipment of a second point-to-multipoint class, the method comprising:

receiving said information content from a source;

collecting information from said plurality of mobile equipment related to a capability thereof of receiving said information content from a point-to-multipoint radio bearer;

selecting parameters of at least one radio bearer configuration for the transmission of said information content to both said first and said second groups of mobile equipment based on the collected information; and transmitting said information content to both said first and said second groups of mobile equipment on at least one radio bearer configured according to said radio bearer configuration.

Preferred versions of the method of the present invention further comprise counting a first number of said plurality of mobile equipment and also further comprise comparing said first number with a first predetermined threshold. In this embodiment, collecting information from said plurality of mobile equipment comprises sending an inquiry to said plurality of mobile equipment, the inquiry requesting parameters of a supported point-to-multipoint radio transmission, in case said first number is lower than or equal to said first predetermined threshold. In another preferred embodiment, collecting information from said plurality of mobile equipment comprises sending to said plurality of mobile equipment a default configuration of a point-to-multipoint transmission. The collecting of information from said plurality of mobile equipment may further comprise requesting to said plurality of mobile equipment a feedback related to a support of said default configuration of point-to-multipoint transmission, in case said first number is higher than said first threshold.

In another preferred embodiment of the method of the present invention, selecting said parameters of said radio bearer configuration based on the collected information comprises counting a second number of the first or of the second group of mobile equipment supporting a predetermined point-to-multipoint transmission and said selecting said parameters of said radio bearer configuration may further comprise comparing said second number with a second predetermined threshold, wherein said selecting said parameters of said radio bearer configuration may comprise configuring a point-to-multipoint radio bearer, in case said second number is higher than said second predetermined threshold, wherein said transmitting said information content to said first and said second groups of mobile equipment may comprise transmitting said information on said configured point-to-multipoint radio bearer. In other preferred embodiments of the present invention, said selecting said parameters of said radio bearer configuration may comprise configuring a number of point-to-point radio bearers equal to said second number in case said second number is lower than or equal to said second predetermined threshold, wherein said transmitting said information content to said first and said second groups of mobile equipment may comprise transmitting said information on said configured point-to-point radio bearers.

In a second aspect, the present invention relates to a mobile network adapted for transmitting information content to a plurality of mobile equipment, the mobile equipment of said plurality comprising at least a first group of mobile equipment of a first point-to-multipoint class and a second group of mobile equipment of a second point-to-multipoint class, the mobile network comprising a base station sub-system being adapted to:

receiving said information content from a source;

collecting information from said plurality of mobile equipment related to a capability thereof of receiving said information content from a point-to-multipoint radio bearer;

selecting parameters of at least one radio bearer configuration for the transmission of said information content to both said first and said second groups of mobile equipment based on the collected information; and transmitting said information content to both said first and said second groups of mobile equipment on at least one radio bearer configured according to said radio bearer configuration.

In preferred embodiments of the mobile network, the base station sub-system is further adapted to count a first number of said plurality of mobile equipment, wherein said base station sub-system may be further adapted to compare said first number with a first predetermined threshold, wherein said collecting information from said plurality of mobile equipment performed by said base-station sub-system may comprise sending an inquiry to said plurality of mobile equipment, the inquiry requesting parameters of a supported point-to-multipoint radio transmission in case said first number is lower than or equal to said first predetermined threshold. In another preferred embodiment of the mobile network, the collecting of information from said plurality of mobile equipment performed by said base station sub-system comprises sending to said plurality of mobile equipment a default configuration of a point-to-multipoint transmission. The collecting of information from said plurality of mobile equipment performed by said base station sub-system may further comprise requesting to said plurality of mobile equipment a feedback related to a support of said default configuration of point-to-multipoint transmission, in case said first number is higher than said first threshold.

In another preferred aspect of the mobile network of the present invention, the selecting of said parameters of said radio bearer configuration based on the collected information performed by said base station sub-system comprises counting a second number of the first or of the second group of mobile equipment supporting a predetermined point-to-multipoint transmission, wherein said selecting said parameters of said radio bearer configuration performed by said base station sub-system may further comprise comparing said second number with a second predetermined threshold, wherein said selecting said parameters of said radio bearer configuration performed by said base station sub-system may comprise configuring a point-to-multipoint radio bearer, in case said second number is higher than said second predetermined threshold, wherein said transmitting said information content to said first and said second groups of mobile equipment performed by said base station sub-system may comprise transmitting said information on said configured point-to-multipoint radio bearer. In still another preferred embodiment of the mobile network of the present invention, said selecting said parameters of said radio bearer configuration performed by said base station sub-system comprises configuring a number of point-to-point radio bearers equal to said second number, in case said second number is lower than or equal to said second predetermined threshold, wherein said transmitting said information content to said first and said second groups of mobile equipment performed by said base station sub-system may comprise transmitting said information on said configured point-to-point radio bearers.

Features and advantages of the present invention will be made apparent by the following detailed description of preferred embodiments thereof, provided merely by way of non-limitative example, description that will be conducted with reference to the attached drawings.

DETAILED DESCRIPTION OF PREFERRED EMBODIMENTS OF THE INVENTION

A UMTS network comprises a number of logical elements, each one having a defined functionality. In the standards, network elements are defined at the logical level. However, this typically results in a similar physical implementation, since a number of open Interfaces are defined in detail, so that the physical equipment at the endpoint can be provided by different manufacturers. The high-level system architecture of an UMTS network can be functionally grouped into (i) the UTRAN, that handles all the radio-related functionality, and (ii) the CN (Core Network), which is responsible for switching and routing calls and data connections to external networks. To complete the system, the UE interfaces with the user and the radio interface. The UE comprises a mobile equipment and a UMTS Subscriber Identity Module (USIM). The mobile equipment (typically a mobile phone) is used as the radio terminal for radio communication, whereas the USIM is typically a smartcard that holds the subscriber identity, performs algorithms for authentication of the subscriber in the network, stores authentication and encryption keys: The design of both the UE and the UTRAN is based on the needs of the W-CDMA radio technology. On the other hand, the structure of the CN is practically identical to that of GSM/GPRS.

Figure 1:
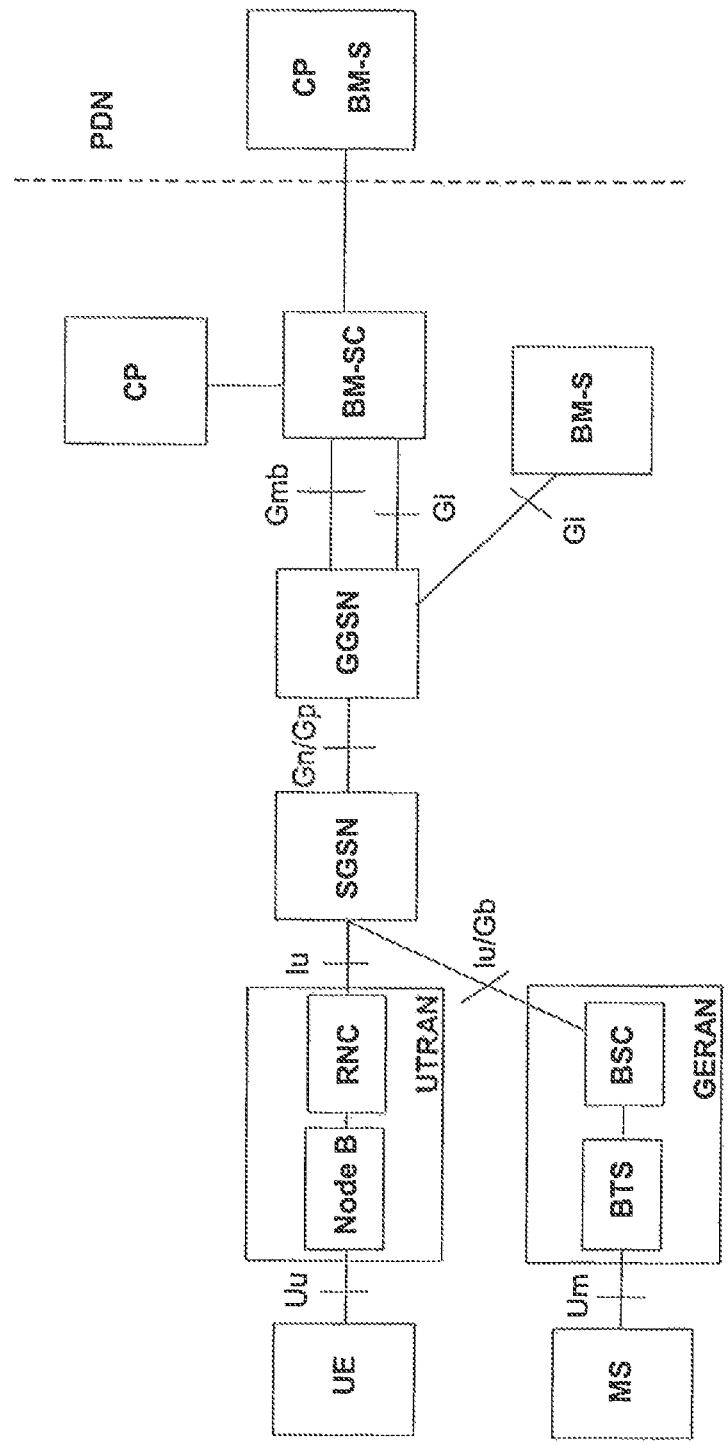
FIG. 1 schematically shows an exemplary UMTS network architecture adapted for support of a MBMS service according to the invention.

FIG. 1 schematically shows an architecture of a UMTS network adapted for support of an MBMS service according to the present invention.

To provide MBMS bearer services, some functional entities of the UMTS network, such as the GGSN (Gateway GPRS Support Node), the SGSN (Serving GPRS Support Node), the RNC/BSC (Radio Network Controller/Base Station Controller), perform several MBMS related functions and procedures, some of which are specific to MBMS. Specific functional entities, such as the Broadcast Multicast Service Centre (BM-SC), may be also provided in the UMTS network for the provisioning of the MBMS services.

More particularly, with reference to FIG. 1, the BM-SC provides functions for MBMS service provisioning and delivery. It may serve as an entry point for MBMS transmissions of content information provided by a source of content information, such as a content provider (indicated as CP in FIG. 1). Typically, it is also used to authorize and initiate MBMS Bearer Services within the mobile network and can be used to schedule and deliver MBMS transmissions. Furthermore, it can be connected, through a packet-domain network (PDN), for example the Internet, to one or more external Content Provider/Broadcast Multicast servers (CP/BM-S), providing content information to be transmitted via MBMS to the UEs.

The BM-SC is able to provide the UEs (or the Mobile Stations, indicated as MS in FIG. 1) with the information content using MBMS bearer services and may schedule MBMS session retransmissions, as well as label each MBMS session with an MBMS Session Identifier to allow the UEs/ MSs to distinguish the MBMS session retransmissions. Service announcements for multicast and broadcast MBMS user services, as well as media descriptions specifying the media to be delivered as part of an MBMS user service (e.g. type of video and audio encodings), can be also provided by the BM-SC. Furthermore, the BM-SC may be able to provide the UEs/MSs with MBMS session descriptions specifying the MBMS sessions to be delivered as part of an MBMS user service (e.g. multicast service identification, addressing, time of transmission, etc.)

The UE (User Equipment) supports functions for the activation/deactivation of the MBMS bearer service. Once a particular MBMS bearer service is activated, no further explicit user request should be required to receive MBMS data although the user may be notified that data transfer is about to start.

The UE may, depending on terminal capabilities, be able to receive MBMS user service announcements, paging information or support simultaneous services. For example the user can originate or receive a call or send and receive messages whilst receiving MBMS video content.

Similar or identical functions are also performed by the MS (Mobile Station), which is a terminology for a User Equipment typically adopted in a GSM/GPRS context. For the purposes of the present invention, the expressions "User Equipment", "Mobile Station", as well as the related acronyms "UE", "MS", have to be considered as completely equivalent.

The UTRAN/GERAN are responsible for efficiently delivering MBMS data to the UEs/MSs camping into a designated MBMS service area. MBMS data are received by the UTRAN/GERAN in a single copy for all the mobile users that have requested the service. UTRAN typically comprises a Radio Network Controller (RNC), controlling a number of Node-Bs. Each Node-B is responsible for radio transmission in a predetermined sub-area (cell) of the service area. GERAN has a similar structure: however, in a GSM/GPRS context the radio network controller is typically known as Base Station Controller (BSC) and the equipment responsible for radio transmission in a specific cell is typically known as Base Transceiver Station (BTS). For the purposes of the present invention, the expressions "Radio Network Controller" and "Base Station Controller", as well as the related acronyms "RNC" and "BSC", have to be considered as completely equivalent. Furthermore, for the purposes of the present invention, the expressions "Node-B" and "Base Transceiver Station", as well as the related acronym "BTS" of the latter, have to be considered as completely equivalent. Moreover, for the purposes of the present invention, the expression "base station sub-system" can equivalently refer to the UTRAN and/or to the GERAN.

The UTRAN/GERAN may be also able to transmit MBMS user service announcements, paging information and support other services in parallel with MBMS, for allowing users having appropriate equipment capability to originate, or receive a call, or send, or receive messages whilst receiving MBMS video content.

The SGSN performs user individual MBMS bearer service control functions and provides MBMS transmissions to the UTRAN/GERAN. The SGSN may be also able to generate billing data per multicast MBMS bearer service for each user. The SGSN may be able to establish Iu and Gn bearers shared by many users on demand when MBMS data has to be transmitted to the users. This can be done upon notification from the GGSN. Likewise, when data is no longer available the SGSN may be able to tear down these bearers upon notification from the GGSN.

The GGSN role serves as an entry point for multicast traffic as MBMS data. Upon notification from the BM-SC the GGSN may be able to request the establishment of a bearer for a broadcast or multicast MBMS transmission. Further, upon BM-SC notification the GGSN may be able to tear down the established bearer. Bearer establishment for multicast services is carried out towards those SGSNs that have requested to receive transmissions for the specific multicast MBMS bearer service. The GGSN may be able to receive multicast traffic (whether from BM-SC or other data sources, such as a Multicast/Broadcast Source, BM-S, internal to the network) and to route this data to the proper GTP (GPRS Tunnel Protocol) tunnels set-up as part of the MBMS bearer service.

In FIG. 1 different interfaces (Uu, Um, Iu, Gb, Gn, Gp, Gmb, Gi) between the various functional entities of the network are also identified. As explained above, such "open" interfaces allow a network operator to build a network with equipment originated from different manufacturers with reduced compatibility issues.

At the UTRAN/GERAN, the MBMS bearer carrying the information content to be distributed to the mobile users may be mapped on a p-t-m channel. The p-t-m channel can be, for example, in the case of UTRAN, the MBMS p-t-m Traffic CHannel (MTCH), with its associated Control channel MCCH, in accordance with the standard. This allows a distribution of the same information content to a large number of mobile users in a very effective way, i.e. by saving transmission power in the Node-Bs of the network. P-t-p channels may be also established, for example, in the case of UTRAN, on Dedicated Traffic CHannels (DTCHs), if the number of mobile users requesting to join the MBMS service in a cell is lower than a given threshold. The value of such threshold can be set for each cell according to the power which is planned as available for p-t-m transmission in the Node-B, and that makes use of p-t-m transmission more convenient with respect to a plurality of p-t-p transmissions. As known by those skilled in the art, the above mentioned UTRAN radio channels are logical channels, that are, in turn, mapped onto physical radio channels.

With regards to the radio configuration, each UE (or MS) should be able to support the p-t-m transmission of the Information content sent by the UTRAN/GERAN in order to properly decode it. Typically, this means that a mobile equipment of a UE should be able to support specific values of a series of transmission parameters related to the p-t-m transmission, such as, for example:
  Maximum bit rate;
  Maximum number of radio links that a UE can simultaneously receive from different cells in order to decode the content information;
  Maximum TTI (Time Transmission Interval);
  Maximum Time Difference between two radio links in selective combining procedures.

A further parameter, referred to in the standard as "total number of channel bits" may be used in order to identify the above parameters as a whole, and represents the available memory for the operations in the mobile equipment at the physical layer. Different values of these parameters may be supported by a mobile equipment for decoding content transmitted on a p-t-p radio bearer (p-t-p capabilities) or on a p-t-m radio bearer (p-t-m capabilities).

Thus, by suitably configuring a p-t-m transmission, e.g. by a MTCH channel, it is possible to distribute the same information content, in particular a multimedia content, with high quality, to a high number of mobile users camping into a cell of the mobile network. However, in a scenario in which different UEs may have different capability from each other of decoding a content transmitted on a p-t-m radio bearer (i.e. different p-t-m capability), it may happen that some of the UEs may properly decode the content, whereas the UEs having lower capability could be unable to decode the same. In such a scenario, in order to reach all the UEs the radio transmission should be targeted on the lowest capability of the UEs: however, this does not allow a full exploitation of the capability of the "high-end" UEs. In all cases, in a scenario in which different UEs may have different p-t-m capability, a service based on a p-t-m transmission could be perceived as unsatisfactory by the mobile users of the service, either because some of them could not practically enjoy the service, or because some of them could perceive the service as a low quality service, as compared with the capability of the owned mobile equipment.

An information content distribution service according to the invention takes into account of this scenario, so that the transmission of the information content can always be optimized according to the capabilities of the UEs that have requested the service. In the remainder of the description, mobile equipment having different p-t-m capability will be also referred to as mobile equipment having different "p-t-m class". Two mobile equipment having different p-t-m class may differ, with regards to p-t-m transmission, in any one of the transmission parameters disclosed above (or in any other parameter related to a p-t-m radio bearer).

In order to accomplish the purpose of distributing the same information content to a plurality of mobile users provided with mobile equipment of different classes, a method according to the invention can be mainly split in two broad phases. In a first phase, the RNC collects information from the UEs that have joined the service, the information being related to the capability of supporting a p-t-m transmission. In a second phase, the RNC uses the collected information in order to properly configure the radio bearer on which the information content will be transmitted.

With regards to the first phase, after a counting of the UEs that have joined the service, the RNC may request to each UE to provide a list of parameters related to a supported p-t-m transmission thereof. This procedure of "UE capability enquiry" allows the RNC to collect complete information related to the capability (or class) of the UEs that have requested the MBMS service, in order to select a proper configuration for the transmission of the information content to the plurality of mobile users. For example, if a majority of UEs have high decoding capability of the p-t-m transmission, the RNC may set-up a high quality p-t-m radio bearer, for serving the plurality of "high-end" UEs, and a number of p-t-p radio bearers (or another p-t-m radio bearer) at a lower quality for serving UEs of lower class. However, this mechanism of "explicit" collection of information from the various UEs may cause an excessive signaling load in the uplink path (i.e. from UEs to the Node-B), in terms of required transmission power for the signaling channels, so as to possibly cause a strong reduction of the number of mobile users served in the cell. Furthermore, the "explicit" procedure may also cause an excessive data processing load at the RNC. In order to reduce or avoid the load at the Node-B and/or at the RNC, in preferred embodiments of the invention the "explicit" procedure is used only if the counted number N of UEs joined to the service is lower than or equal to a predetermined first threshold $N_{max}$, that may be set by the mobile network operator taking into account of the power which is planned as available for p-t-m transmission in the Node-B, and that makes use of p-t-m transmission more convenient with respect to a plurality of p-t-p transmissions.

If the number N of UEs that have requested the service is higher than the first threshold $N_{max}$, information from the UEs may be collected in an "implicit" manner by the RNC. In more detail, the RNC may select parameters for a default p-t-m transmission (for example targeted to a predefined class of MBMS UEs), signal to the UEs this default transmission configuration, e.g. by means of the downlink MCCH control channel, and requesting thereof a feedback related to the ability of supporting this p-t-m configuration. More particularly, the feedback may be preferably requested only to the UEs that are not able to support the selected p-t-m configuration. Together with the feedback, the UEs (particularly the UEs that do not support the selected p-t-m configuration) may preferably also provide their p-t-m capability, e.g. a list of parameters of a supported p-t-m configuration. Based on the answers received on the uplink by the UEs, the RNC may select a proper configuration for the transmission of the information content to the plurality of mobile users. For example, if a sufficient number of UEs supports the default configuration, a p-t-m radio bearer can be set-up for these UEs, together with a number of p-t-p radio bearers for the remaining UEs.

Figure 2:
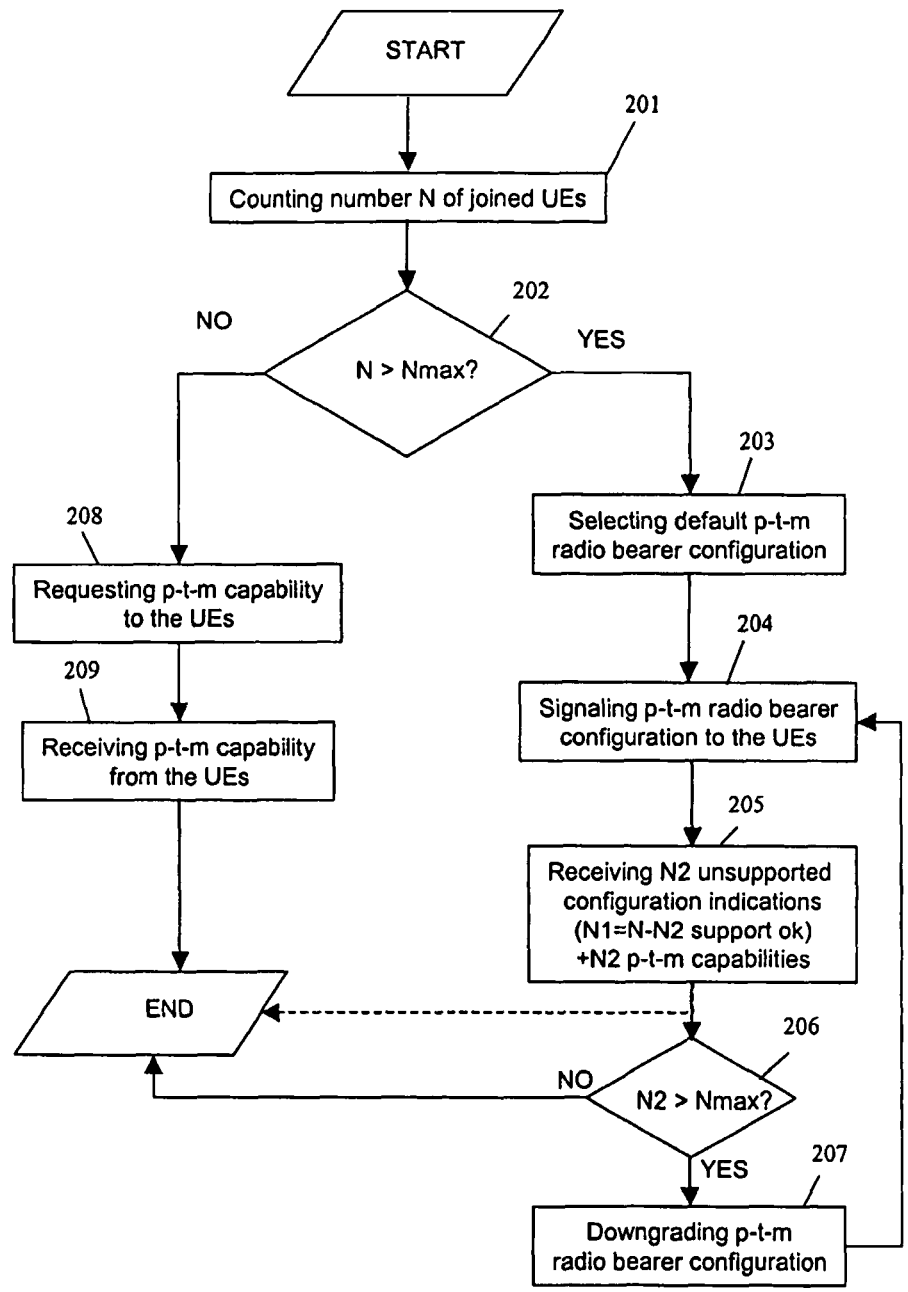
FIG. 2 shows a flow chart with operations performed by a RNC of a UMTS network for collecting information from the UEs related to their p-t-m capabilities, in an exemplary MBMS service according to the invention.
Figure 3:
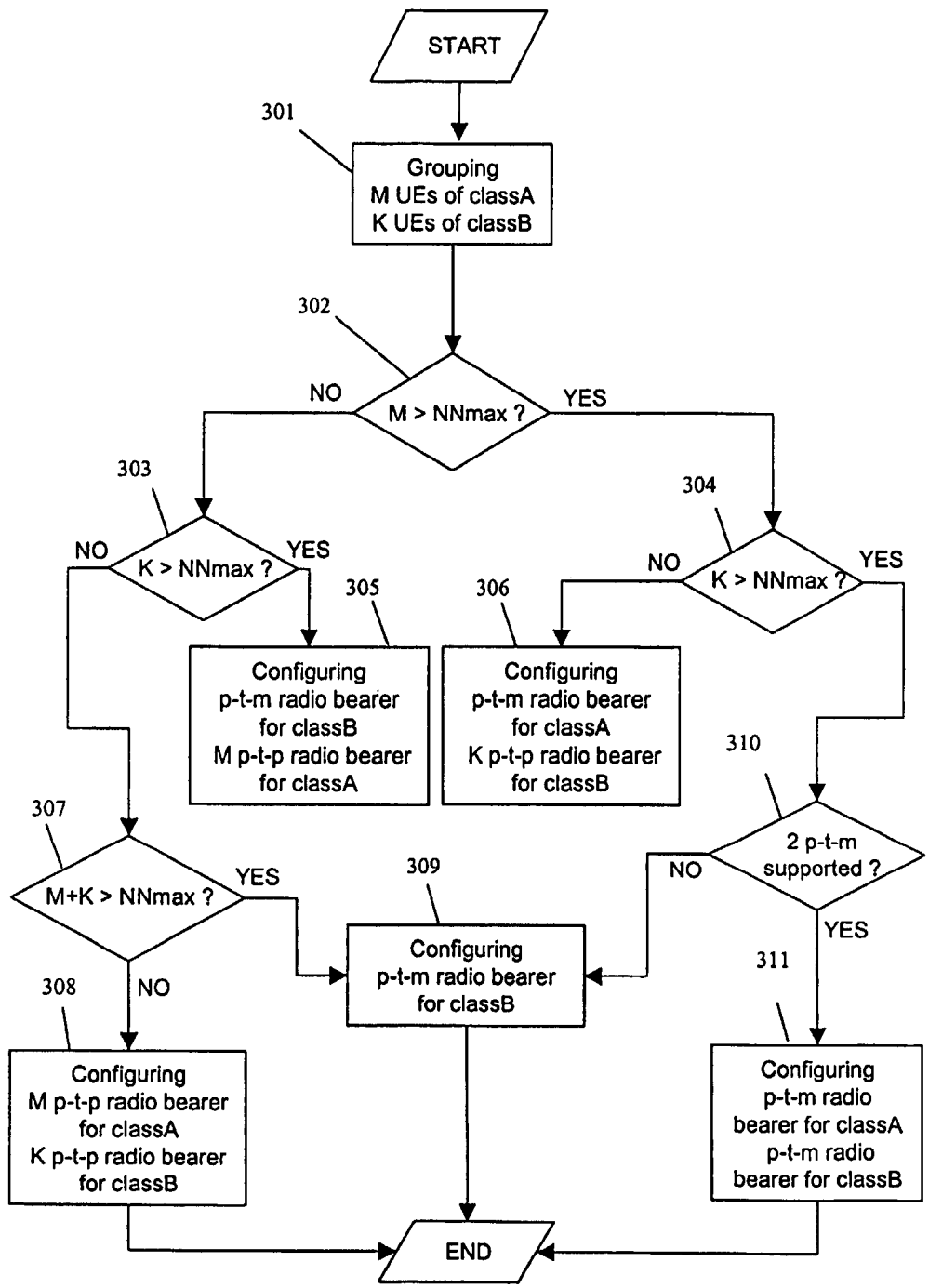
FIG. 3 shows a flow chart with operations performed by a RNC of a UMTS network for selecting an optimized configuration for the content transmission, in an exemplary MBMS service according to the invention.

In greater detail, FIG. 2 and FIG. 3 show a preferred embodiment of a complete procedure that can be applied by the RNC in order to properly configure a transmission for the distribution of the same information content to a plurality N of UEs. FIG. 2 refers to the above mentioned first phase of the procedure, in which the RNC collects information from the UEs. FIG. 3 refers to the above mentioned second phase, in which the RNC uses the collected information in the first phase in order to properly configure the MBMS radio bearer on which the information content is transmitted.

With reference to FIG. 2, the RNC, in accordance with the MBMS framework, may first estimate the number N of UEs joined to the service in a determined cell (block 201). If N is higher than a first threshold $N_{max}$ (decision block 202), the implicit procedure of collecting Information related to the p-t-m capability of the UEs is used by the RNC, so as to reduce the quantity of information to be exchanged with the UEs.

According to the preferred implicit procedure shown in FIG. 2, the RNC selects a default p-t-m radio bearer configuration (block 203), and signals such configuration to the UEs (block 204), in order to gain information related to how many UEs are not able to support the selected p-t-m transmission. For example, the transmission parameters for the default p-t-m configuration could be set by the network operator as those providing the highest transmission quality for the content. After having received the answers from the UEs, the RNC is aware that a number N2 of UEs cannot support the selected p-t-m configuration, and can derive the number N1 of UEs being able to support the p-t-m configuration, i.e. N1=N−N2 (block 205). Together with the feedback, the UEs (particularly the N2 UEs that do not support the selected p-t-m configuration) may preferably also provide to the RNC their p-t-m capability.

If the number N2 of UEs that cannot support the selected p-t-m configuration is higher than the first threshold $N_{max}$ (decision block 206, "YES" branch), then the RNC may select a downgraded p-t-m radio bearer configuration (block 207), e.g. by selecting a lower transmission bit rate (or a lower value of any other p-t-m transmission parameter), and repeating the procedure of request to the UEs to provide information on the support of the new p-t-m radio bearer (from block 204), as disclosed above. This procedure can be repeated by the RNC until the number N2 of UEs that cannot support the selected p-t-m radio bearer is less then the first threshold $N_{max}$ (decision block 206, "NO" branch). It is noticed that this condition can be always reached, since according to the MBMS standard a set of minimum parameters should be supported by MBMS UEs for a p-t-m transmission. It is also noticed that in presence of only two different existing p-t-m classes of MBMS UEs, sufficient information for configuring the MBMS radio bearer is gained by the RNC, with the implicit procedure, after having received the feedback from the UEs (at block 205), without the further comparison between the number N2 of UEs that do not support the selected p-t-m configuration and the first threshold $N_{max}$. As a matter of fact, in presence of only two p-t-m classes the feedback received from the UEs allow to. Immediately recognize how many UEs support a higher quality p-t-m transmission configuration and how many UEs support a lower quality p-t-m transmission configuration. This fact is represented in FIG. 2 by the dashed arrow pointing the "End" block.

In case the number N of UEs joined to the service is lower than the first threshold $N_{max}$ (decision block 202, "NO" branch), a procedure of explicit request of the capabilities of the N UEs may be applied by the RNC. In this explicit procedure, the RNC sends an enquiry to the N UEs (block 208), in which a list of supported parameters for a p-t-m transmission (i.e. the p-t-m capability) is requested to the UEs. Each UEs is enquired in this procedure. The answer is provided by the enquired UEs on a signaling channel (block 209).

After the procedure of collecting information described above (first phase), the RNC is then in the condition to perform the second phase of the procedure, in which an optimized MBMS radio bearer configuration is selected based on the collected information, to allow all the UEs to exploit the information content, but also the UEs having higher capability to take advantage of the higher capability to get a high quality service.

In preferred embodiments, the RNC may group the received information according to different UE p-t-m classes, so as to verify if at least one p-t-m radio bearer could be configured for serving at least a group of UEs of the same class.

In greater detail, FIG. 3 shows a possible flow chart with exemplary operations that could be carried out by the RNC, in the second phase, for selecting an optimized configuration for the MBMS radio bearer, in case two p-t-m classes of UEs are present in a cell, namely classA (high-end) and classB (low-end). Based on the Information collected during the first phase, the selection of the better configuration for the transmission of the information content to the N UEs may be based on a grouping of the Information (block 301), so as to distinguish the UEs of classA (M) from the UEs of classB (K, wherein it holds M+K=N). The number of both groups of UEs is then compared with a second threshold $NN_{max}$ (decision blocks 302, 303, 304), indicative of the possibility of setting up at least one p-t-m radio bearer for transmitting the information content (and the parameters of the p-t-m radio bearer).

In particular, if both M and K are higher than the second threshold $NN_{max}$ (decision blocks 302, 304, "YES" branches), then two p-t-m radio bearers having different transmission parameters could be set up, a higher quality one for serving the M UEs of high-end classA, a lower quality one for serving the low-end K UEs of classB (block 311, as a result of decision block 310, "YES" branch). However, it may happen that the transmission, at the same time, of two different p-t-m radio bearers is not supported by the Node-B: In such case, one p-t-m radio bearer may be set up, configured for serving the low-end UEs of classB, so that the configuration is also supported by the high-end UEs of classA (block 309, as a result of decision block 310, "NO" branch).

If one between M and K is lower than or equal to the second threshold $NN_{max}$ and the other one is higher than the second threshold $NN_{max}$, then the RNC may set-up a p-t-m radio bearer and a number of p-t-p radio bearers. In particular, the RNC could set-up one p-t-m radio bearer for serving the M UEs of classA and K p-t-p radio bearers for serving the K UEs of classB (block 306); alternatively, the RNC could set-up one p-t-m radio bearer for serving the K UEs of classB and M p-t-p radio bearers for serving the M UEs of classA (block 305).

If both M and K are lower than or equal to the second threshold $NN_{max}$, it may however happen that their sum N+K Is higher than the second threshold $NN_{max}$ (decision block 307). In such case, it is advantageous for the RNC to set up one p-t-m radio bearer, in place of M+K p-t-p radio bearers. Such p-t-m radio bearer is set up for serving the low-end UEs of classB, so that the configuration is also supported by the high-end UEs of classA (block 309, as a result of decision block 307, "YES" branch). On the other hand, if the sum M+K is lower than or equal to the second threshold $NN_{max}$, the RNC sets up M p-t-p radio bearers for serving the M UEs of classA and K p-t-p radio bearers for serving the K UEs of classB (block 308, as a result of decision block 307, "NO" branch).

To sum up, by using the procedure according to the invention an optimized configuration for the radio transmission of the information content to all the mobile users joined to the service can be found in a very effective manner, even if said users own UEs of different classes.

For example, by considering existence of UEs of two different p-t-m classes, differing from each other In the maximum bit rate supported for p-t-m transmission (e.g. 64 kbps for classA, 128 kbps for classB), the following table 1 shows possible configurations of p-t-m/p-t-p radio bearers that may be selected by the RNC according to different situations:

TABLE 1

| | Number of UE of classA | Number of UE of classB | Radio bearer configuration |
|---|---|---|---|
| 1 | High | High | p-t-m radio bearer at 64 kbps |
| 2 | High | High | p-t-m radio bearer at 64 kbps + p-t-m radio bearer at 128 kbps |
| 3 | High | Low | p-t-m radio bearer at 64 kbps + p-t-p radio bearer at 128 kbps |
| 4 | Low | High | p-t-p radio bearer at 64 kbps + p-t-m radio bearer at 128 kbps |
| 5 | Low | Low | p-t-p radio bearer at 64 kbps + p-t-p radio bearer at 128 kbps |
| 6 | Low | Low | p-t-m radio bearer at 64 kbps |

In table 1, a "high" number of UEs has to be understood as a number of UEs higher than the second threshold $NN_{max}$. On the contrary, a "low" number of UEs has to be understood as a number of UEs lower than or equal to the second threshold $NN_{max}$. The configurations in the first and in the second rows are two possible mutual alternatives: in particular, the configuration of the first row may be used if the transmission at the same time of two different p-t-m radio bearers cannot be supported by the Node-B. The configurations in the fifth and in the sixth rows are also two possible mutual alternatives: in particular, the configuration in the sixth row can be used if the sum of the number of UEs of classA and the number of UEs of classB is higher than the second threshold $NN_{max}$. The selection of the best configuration among those shown above is based on the result of the information collected from the UEs, by means of the above disclosed implicit or explicit procedure of enquiry to the UEs, according to the instant situation. It has to be understood that any other transmission parameter (or combination of parameters) can be used in place of the bit rate to identify the classA and the classB. Furthermore, the radio bearers can be configured also in case of existence of UEs of more than two p-t-m classes.

The procedure explained above allows to configure the radio bearer(s) for the transmission of the same information content to a plurality of mobile users in an effective and optimized manner, each time taking into account of the number and of the different capabilities of the UEs (or MSs) joined to the service. This advantageously allows a mobile operator to provide, every time, the service to all mobile users, possibly at the top of the quality allowed by their mobile equipment.

The collection of information from the UEs, on which the selection of the configuration of the radio bearer(s) is based, can be done by exploiting procedures already defined by the standard, adapted for the purposes of the present invention.

For example, the explicit procedure in which all the UEs are enquired one by one to provide their p-t-m capability can be an adaptation of the known procedure of UE CAPABILITY ENQUIRY, typically used by a RNC to establish a p-t-p radio bearer with a UE (see 3GPP Technical Specification TS25.331, Release99). This known procedure can be adapted, or extended, by providing that the p-t-m transmission parameters be included among the parameters sent by the UE to the UTRAN on the uplink, by means of an RRC (Radio Resource Control) connection between the UE and the RNC.

Furthermore, as described above, the implicit procedure provides that a default configuration of a p-t-m bearer is initially sent to the UEs, requesting the UEs to provide an answer if the default configuration is not supported. This operation can be carried out by exploiting, for example, the MBMS RADIO BEARER INFORMATION, i.e. a procedure already defined by the Technical Specifications for the MBMS services (e.g. 3GPP TS 25.346), which is typically used to send the parameters of the MBMS radio bearer to the UEs joined to a MBMS service. This procedure could be adapted, or extended, by providing, in the downlink MBMS RADIO BEARER INFORMATION message, a field "RB UNSUPPORT CONFIG REPORT REQUIRED", set to a logical value "Yes" in case the RNC wishes to have a feedback from the UEs that do not support the configured p-t-m transmission (included in another portion of the MBMS RADIO BEARER INFORMATION message). The logical value "No" can be used if the explicit procedure is being used by the RNC for receiving information from the UEs about their p-t-m capability. Each UE that does not support the configured p-t-m transmission may then provide its feedback by sending, e.g. by means of a RRC connection (either established for such purpose or already active), a message "MBMS RB UNSUPPORTED CONFIG", including the parameter or parameters of the p-t-m radio bearer unsupported by the UE. Possibly, such message could also include the p-t-m capabilities of the UE.

The invention claimed is:

1. A computer-implemented method of transmitting information content to a plurality of mobile equipment, the mobile equipment of said plurality comprising at least a first group of mobile equipment of a first point-to-multipoint (PTM) class and a second group of mobile equipment of a second PTM class, the method comprising:
receiving, at a base station controller or radio network controller, said information content from a source;
collecting, by the base station controller or radio network controller, information from said plurality of mobile equipment related to a capability of a respective one of the plurality of mobile equipment to receive said information content from a PTM radio bearer, said collecting information comprising:
counting a first number of said plurality of mobile equipment that are joined to an MBMS service;
comparing said first number with a first predetermined threshold;
in case said first number is higher than said first predetermined threshold, sending to said plurality of mobile equipment a default configuration of a PTM transmission, and requesting to said plurality of mobile equipment a feedback related to a support of said default configuration of PTM transmission;
in case said first number is lower than or equal to said first predetermined threshold, sending an inquiry to each of said plurality of mobile equipment, the inquiry requesting parameters of a supported PTM radio transmission;
selecting, by the base station controller or radio network controller, configuration parameters of at least one radio bearer configuration for the transmission of said information content to both said first and said second groups of mobile equipment based on the collected information; and
transmitting, by the base station controller or radio network controller, said information content to both said first and said second groups of mobile equipment via at least one radio bearer configured according to said radio bearer configuration.

2. The method of claim 1, wherein said selecting said parameters of said radio bearer configuration based on the collected information comprises counting a second number of the first or of the second group of mobile equipment supporting a predetermined PTM transmission.

3. The method of claim 2, wherein said selecting said parameters of said radio bearer configuration further comprises comparing said second number with a second predetermined threshold.

4. The method of claim 3, wherein said selecting said parameters of said radio bearer configuration comprises configuring a PTM radio bearer in case said second number is higher than said second predetermined threshold.

5. The method of claim 4, wherein said transmitting said information content to said first and said second groups of mobile equipment comprises transmitting said information content on said configured PTM radio bearer.

6. The method of claim 3, wherein said selecting said parameters of said radio bearer configuration comprises configuring a number of point-to-point (PTP) radio bearers equal to said second number, in case said second number is lower than or equal to said second predetermined threshold.

7. The method of claim 6, wherein said transmitting said information content to said first and said second groups of mobile equipment comprises transmitting said information content on said configured PTP radio bearers.

8. A mobile network adapted for transmitting information content to a plurality of mobile equipment, the mobile equipment of said plurality comprising at least a first group of mobile equipment of a first point-to-multipoint (PTM) class and a second group of mobile equipment of a second PTM class, the mobile network comprising a base station sub-system configured to:
   receive said information content from a source;
   collect information from said plurality of mobile equipment related to a capability thereof of receiving said information content from a PTM radio bearer, said collecting information comprising:
      counting a first number of said plurality of mobile equipment that are joined to an MBMS service;
      comparing said first number with a first predetermined threshold;
      in case said first number is higher than said first predetermined threshold, sending to said plurality of mobile equipment a default configuration of a PTM transmission, and requesting to said plurality of mobile equipment a feedback related to a support of said default configuration of PTM transmission;
      in case said first number is lower than or equal to said first predetermined threshold, sending an inquiry to said plurality of mobile equipment, the inquiry requesting parameters of a supported PTM radio transmission;
   select configuration parameters of at least one radio bearer configuration for the transmission of said information content to both said first and said second groups of mobile equipment based on the collected information; and
   transmit said information content to both said first and said second groups of mobile equipment via at least one radio bearer configured according to said radio bearer configuration.

9. The mobile network of claim 8, wherein said selecting said parameters of said radio bearer configuration based on the collected information performed by said base station sub-system comprises counting a second number of the first or of the second group of mobile equipment supporting a predetermined PTM transmission.

10. The mobile network of claim 9, wherein said selecting said parameters of said radio bearer configuration performed by said base station sub-system further comprises comparing said second number with a second predetermined threshold.

11. The mobile network of claim 10, wherein said selecting said parameters of said radio bearer configuration performed by said base station sub-system comprises configuring a PTM radio bearer in case said second number is higher than said second predetermined threshold.

12. The mobile network of claim 11, wherein said transmitting said information content to said first and said second groups of mobile equipment performed by said base station sub-system comprises transmitting said information content on said configured PTM radio bearer.

13. The mobile network of claim 10, wherein said selecting said parameters of said radio bearer configuration performed by said base station sub-system comprises configuring a number of point-to-point (PTP) radio bearers equal to said second number in case said second number is lower than or equal to said second predetermined threshold.

14. The mobile network of claim 13, wherein said transmitting said information content to said first and said second groups of mobile equipment performed by said base station sub-system comprises transmitting said information content on said configured PTP radio bearers.

\* \* \* \* \*